United States Patent
Lee et al.

(10) Patent No.: US 10,520,760 B2
(45) Date of Patent: Dec. 31, 2019

(54) SYSTEM AND METHOD FOR MANUFACTURING OPTICAL DISPLAY ELEMENT

(71) Applicant: LG CHEM, LTD., Seoul (KR)

(72) Inventors: Beom Seok Lee, Daejeon (KR); Suk Jae Lee, Daejeon (KR); Kyung Hyeok Park, Daejeon (KR); San Park, Daejeon (KR); Hang Suk Choi, Daejeon (KR); Eung Jin Jang, Daejeon (KR); Bong Su Jeung, Daejeon (KR); Jea Han Ryoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/604,159

(22) Filed: May 24, 2017

(65) Prior Publication Data

US 2017/0341362 A1  Nov. 30, 2017

(30) Foreign Application Priority Data

May 30, 2016 (KR) ........................ 10-2016-0066194

(51) Int. Cl.
*B32B 37/00* (2006.01)
*G02F 1/13* (2006.01)
(Continued)

(52) U.S. Cl.
CPC ........ *G02F 1/1303* (2013.01); *B32B 37/0046* (2013.01); *B32B 37/02* (2013.01);
(Continued)

(58) Field of Classification Search
CPC ............ B32B 38/1808; B32B 38/1816; B32B 37/0046; B32B 37/02; B32B 37/203;
(Continued)

(56) References Cited

U.S. PATENT DOCUMENTS

| 2012/0071058 A1 | 3/2012 | Hirata et al. | |
| 2012/0300377 A1* | 11/2012 | Hirata | B65G 49/061 361/679.01 |
| 2015/0047766 A1* | 2/2015 | Yura | G02B 5/3033 156/64 |

FOREIGN PATENT DOCUMENTS

| CN | 102411229 A | 4/2012 |
| CN | 103226256 A | 7/2013 |

(Continued)

*Primary Examiner* — John L Goff, II
(74) *Attorney, Agent, or Firm* — Dentons US LLP

(57) ABSTRACT

According to the present invention, a system for manufacturing an optical display element, which manufactures an optical display element by laminating optical films on both planes of a rectangular panel, includes: a panel supply unit supplying the panel; a panel transport unit transporting the supplied panel; a first laminating unit laminating the optical film onto a first plane of the panel in a direction parallel to a panel transport direction; and a second laminating unit laminating the optical film onto a second plane of the panel so that an absorption axis direction of the optical film is orthogonal to the absorption axis direction of the optical film laminated onto the first plane of the panel, in which when a panel supply direction set to be parallel to the panel transport direction between a longitudinal direction of an initial long edge and the longitudinal direction of an initial short edge of the panel supplied by the panel supply unit and a first laminating direction set so as to laminate the optical film onto the first plane of the panel in one of the longitudinal direction of a long edge and the longitudinal direction of a short edge of the panel are previously set as a process condition, the system includes a first pivot unit that pivots the panel to reverse positional relationship of the initial long edge and the initial short edge of the panel to each other when the set panel transfort direction is orthogonal to the first laminating direction.

10 Claims, 13 Drawing Sheets

(51) Int. Cl.
*B32B 37/02* (2006.01)
*B32B 37/20* (2006.01)
*B32B 38/18* (2006.01)
*G02F 1/1335* (2006.01)
*B32B 38/00* (2006.01)

(52) U.S. Cl.
CPC ........ *B32B 37/203* (2013.01); *B32B 38/1816* (2013.01); *G02F 1/133528* (2013.01); *B32B 38/0004* (2013.01); *B32B 2307/42* (2013.01); *B32B 2457/202* (2013.01)

(58) Field of Classification Search
CPC ................ B32B 39/00; B32B 2457/20; B32B 2457/202; G02F 1/1303; G02F 1/1333; G02F 1/133528
See application file for complete search history.

(56) References Cited

FOREIGN PATENT DOCUMENTS

| | | |
|---|---|---|
| CN | 104737065 A | 6/2015 |
| CN | 105044802 A | 11/2015 |
| CN | 105122335 A | 12/2015 |
| CN | 105247409 A | 1/2016 |
| JP | 2016-051145 A | 4/2016 |
| KR | 10-2011-0048203 A | 5/2011 |
| KR | 10-1495763 B1 | 2/2015 |

\* cited by examiner (a)

(b)

SYSTEM AND METHOD FOR MANUFACTURING OPTICAL DISPLAY ELEMENT

This application is a Utility Application which claims priority to and the benefit of Korean Patent Application No. 10-2016-0066194 filed on May 30, 2016, which is hereby incorporated by reference in its entirety herein.

TECHNICAL FIELD

The present invention relates to a system and a method for manufacturing an optical display element, and more particularly, to a system and a method for manufacturing an optical display element, which can manufacture a plurality of types of optical display elements by a single manufacturing line.

BACKGROUND ART

In general, a liquid crystal panel including liquid crystal cells is configured by disposing the liquid cells between a substrate disposed at a light source side and a substrate viewed by an observer.

In addition, the liquid crystal panel may be divided into a so called O mode liquid crystal panel and a so called E mode liquid crystal panel according to a correlation between an initial alignment direction of the liquid crystal cells and an absorption axis direction of a polarization plate laminated to the substrate side disposed at the light source side.

Meanwhile, a manufacturing system that manufactures the optical display element by laminating optical films on both planes of a rectangular liquid crystal panel in the related art includes an apparatus that laminates the optical film formed on a width corresponding to a long edge of the liquid crystal panel and an apparatus that laminates the optical film formed on a width corresponding to a short edge of the liquid crystal panel and is configured in such a manner that one of the respective laminating apparatuses is laminated only to the substrate disposed at the light source side and the other one is laminated only to the substrate viewed by the observer.

The optical display element manufacturing system in the related art has a problem in that only one mode liquid crystal panel of the O mode liquid crystal panel and the E mode liquid crystal panel associated with a direction in which the optical film is laminated to the light source side cannot but be manufactured.

DETAILED DESCRIPTION OF THE INVENTION

Technical Problem

The present invention is contrived to solve the problem and an object of the present invention is to provide a method and a system for manufacturing an optical display element, which can manufacture a plurality of optical display elements of a type in which laminating directions are different from each other by a single manufacturing line based on one plane of a panel.

Technical Solution

An exemplary embodiment of the present invention provides a system for manufacturing an optical display element, which manufactures an optical display element by laminating optical films on both planes of a rectangular panel, including: a panel supply unit supplying the panel; a panel transport unit transporting the supplied panel; a first laminating unit laminating the optical film onto a first plane of the panel in a direction parallel to a panel transport direction; and a second laminating unit laminating the optical film onto a second plane of the panel so that an absorption axis direction of the optical film is orthogonal to the absorption axis direction of the optical film laminated onto the first plane of the panel, wherein when a panel supply direction set to be parallel to the panel transport direction between a longitudinal direction of an initial long edge and the longitudinal direction of an initial short edge of the panel supplied by the panel supply unit and a first laminating direction set so as to laminate the optical film onto the first plane of the panel in one of the longitudinal direction of a long edge and the longitudinal direction of a short edge of the panel are predetermined as a process condition, the system includes a first pivot unit that pivots the panel to reverse positional relationship of the initial long edge and the initial short edge of the panel to each other when the set panel transport direction is orthogonal to the first laminating direction.

Herein, according to the optical display element manufacturing system, in the optical display element, the panel may include liquid crystal cells and the first plane of the panel may be disposed at a light source of the liquid crystal cells.

Herein, according to the optical display element manufacturing system, the optical film may include a polarization plate and in the process condition, the first laminating direction may be set in such a manner that an initial alignment direction of the liquid crystal cells is parallel to the absorption axis direction of the polarization plate included in the optical film laminated onto the first plane of the panel.

Herein, according to the optical display element manufacturing system, the optical film may include a polarization plate and in the process condition, the first laminating direction may be set in such a manner that an initial alignment direction of the liquid crystal cells may be orthogonal to the absorption axis direction of the polarization plate included in the optical film laminated onto the first plane of the panel.

Herein, according to the optical display element manufacturing system, a first optical film is unrolled from a first film roll on which the first optical film, which elongates with a width corresponding to the long edge of the panel, is rolled, and laminated onto one of the first and second planes of the panel, and a second optical film is unrolled from a second film roll on which the second optical film, which elongates with a width corresponding to the short edge of the panel, is rolled, and laminated onto the second plane of the panel, which is opposite to the plane onto which the first optical film is laminated, to manufacture the optical display element.

Herein, according to the optical display element manufacturing system, based on the first laminating direction in the process condition, the first optical film may be used for one of the first and second laminating units and the second optical film may be used for the other one of the first and second laminating units.

Herein, according to the optical display element manufacturing system, each of the first and second laminating units may be formed to correspond to the widths of both the first and second optical films.

Herein, according to the optical display element manufacturing system, the first laminating unit may include a first optical film supply section unrolling and supplying the optical film from the film roll on which the optical film is rolled and a first laminating section laminating the optical film supplied from the first optical film supply section onto the fir plane of the panel, the second laminating unit includes a second optical film supply section unrolling and supplying the optical film from the film roll on which the optical film is rolled and a second laminating section laminating the optical film supplied from the second optical film supply section onto the second plane of the panel, each of the first optical film supply section and the second optical film supply section may be formed to correspond to the widths of both the first film roll and the second film roll, and each of the first and second laminating sections may be formed to correspond to the widths of both the first and second optical films.

Herein, the optical display element manufacturing system may further include a second pivot unit pivoting the panel so as to reverse the positional relationship of the long side and the short side of the panel to each other between a time after the optical film is laminated onto the first plane of the panel and a time before the optical film is laminated onto the second plane of the panel.

Herein, according to the optical display element manufacturing system, the second pivot unit may pivot the panel around a pivot axis which is parallel to both planes of the panel and is not parallel to either of the long side and the short side of the panel so as to reverse directions which the first plane and the second plane of the panel face.

Another exemplary embodiment of the present invention provides a method for manufacturing an optical display element, which manufactures an optical display element by laminating optical films on both planes of a rectangular panel, which includes: supplying the panel by a panel supply unit; transporting the panel supplied; laminating by a first laminating unit the optical film onto a first plane of the panel in a direction parallel to a panel transport direction; and laminating by a second laminating unit the optical film onto a second plane of the panel so as to form an absorption axis direction of the optical film is orthogonal to the absorption axis direction of the optical film laminated onto a first plane of the panel, wherein when a panel supply direction set to be parallel to the panel transport direction between a longitudinal direction of an initial long edge and the longitudinal direction of an initial short edge of the panel supplied by the panel supply unit and a first laminating direction set so as to laminate the optical film onto the first plane of the panel in one the longitudinal direction of a long edge and the longitudinal direction of a short edge of the panel are predetermined as a process condition, the method includes pivoting the panel by a first pivot unit so as to reverse positional relationship of an initial long edge and an initial short edge of the panel when the set panel transfort direction is orthogonal to the first laminating direction.

Herein, according to the optical display element manufacturing method, in the optical display element, the panel may include liquid crystal cells and the first plane of the panel may be disposed at a light source of the liquid crystal cells.

Herein, according to the optical display element manufacturing method, the optical film may include a polarization plate and in the process condition, the first laminating direction may be set in such a manner that an initial alignment direction of the liquid crystal cells is parallel to the absorption axis direction of the polarization plate included in the optical film laminated onto the first plane of the panel.

Herein, according to the optical display element manufacturing method, the optical film may include a polarization plate and in the process condition, the first laminating direction may be set in such a manner that an initial alignment direction of the liquid crystal cells may be orthogonal to the absorption axis direction of the polarization plate included in the optical film laminated onto the first plane of the panel.

Herein, according to the optical display element manufacturing method, a first optical film is unrolled from a first film roll on which the first optical film, which elongates with a width corresponding to the long edge of the panel, is rolled and laminated onto one plane of the first and the second planes of the panel, and a second optical film is unrolled from a second film roll on which the second optical film, which elongates with a width corresponding to the short edge of the panel, is rolled and laminated onto the second plane of the panel, which is opposite to the plane onto which the first optical film is laminated, to manufacture an optical display element.

Herein, according to the optical display element manufacturing method, based on the first laminating direction in the process condition, the first optical film is used for one of the laminating an optical film onto the first plane of the panel and the laminating an optical film onto the second plane of the panel and the second optical film is used for the other one of the laminating an optical film onto the first plane of the panel and the laminating an optical film onto the second plane of the panel.

Herein, according to the optical display element manufacturing method, each of the first and second laminating units may be formed to correspond to the widths of both the first and second optical films.

Herein, according to the optical display element manufacturing method, laminating an optical film onto the first plane of the panel may include a first optical film supply step of unrolling and supplying, by a first optical film supply section, the optical film from the film roll on which the optical film is rolled and laminating by a first laminating section the optical film supplied from the first optical film supply section onto the first plane of the panel, the laminating an optical film onto the second plane of the panel may include a second optical film supply step of unrolling and supplying, by a second optical film supply section, the optical film from the film roll on which the optical film is rolled and a 2a-th laminating step of laminating, by a second laminating section, the optical film supplied from the second optical film supply section onto the second plane of the panel, each of the first optical film supply section and the second optical film supply section may be formed to correspond to the widths of both the first film roll and the second film roll, and each of the first and second laminating sections may be formed to correspond to the width of both the first and second optical films.

Herein, the optical display element manufacturing method may further include pivoting the panel by a second pivot unit so as to reverse the positional relationships of the long edge and the short edge of the panel to each other between a time after the optical film is laminated onto the first plane of the panel and a time before the optical film is laminated onto the second plane of the panel.

Herein, according to the optical display element manufacturing method, pivoting the panel by a second pivot unit may pivot by the second pivot unit around a pivot axis which is parallel to both planes of the panel and is not parallel to either of the long edge and the short edge of the panel so as to reverse directions which the first plane and the second plane of the panel face.

Advantageous Effects

In the method and the system for manufacturing an optical display element according to the exemplary embodiments of the present invention, when a set panel supply direction is orthogonal to a first laminating direction set as a direction in which the optical film is laminated to one plane of the panel, the panel is pivoted by a first pivot unit, and as a result, positional relationships of an initial long edge and an initial short edge of a panel supplied by a panel supply unit may be reversed to each other. Herein, under a process condition in which the first laminating direction is selectively set between a long-edge longitudinal direction and a short-edge longitudinal direction of the panel according to the type of the optical display element to be manufactured, at least two types of optical display elements can be manufactured by a single manufacturing line.

EXPLANATION OF REFERENCE NUMERALS AND SYMBOLS

Figure 1:
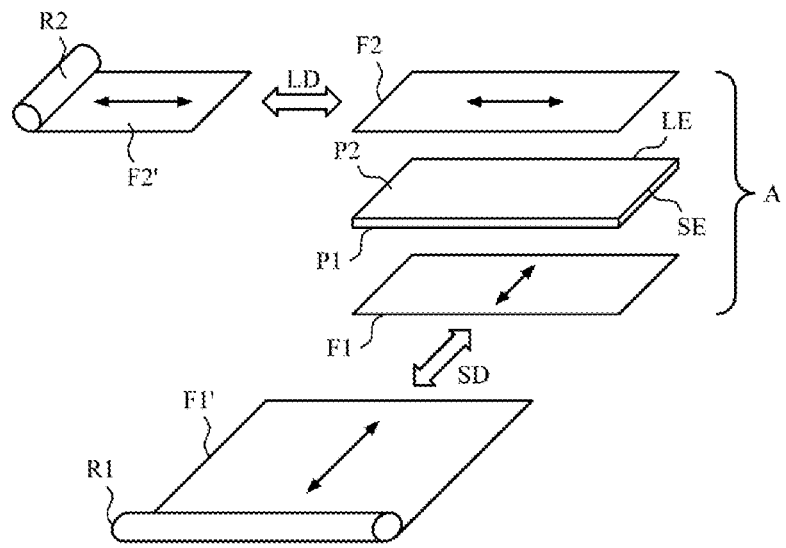
FIG. 1 is a diagram illustrating two types of optical display elements which can be manufactured by a method and a system for manufacturing an optical display element according to an exemplary embodiment of the present invention.
Figure 1:
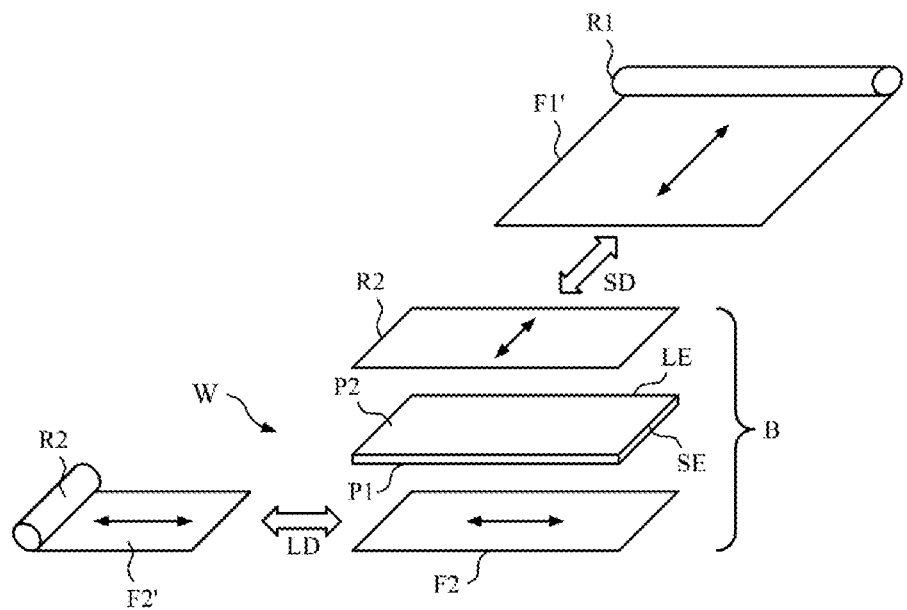

1000: System for continuously manufacturing optical display device
100, 200, 300: System for manufacturing optical display element
10: Panel supply unit
30: First pivot unit
50: First laminating unit
70, 70': Second pivot unit
80: Second laminating unit
W: Panel
P1: One plane of panel
P2: The other plane of panel
F1: First optical film
F2: Second optical film

BEST MODE

Hereinafter, exemplary embodiments of the present invention will be described in detail so as to be easily implemented by those skilled in the art, with reference to the accompanying drawings. However, the present invention can be realized in various different forms, and is not limited to the exemplary embodiments described herein. In addition, a part not related with a description is omitted in order to clearly describe the present invention in the drawings and throughout the specification, like reference numerals designate like elements.

Terms used in the present invention adopt general terms which are currently widely used as possible by considering functions in the present invention, but the terms may be changed depending on an intention of those skilled in the art, a precedent, and emergence of new technology. Further, in a specific case, a term which an applicant arbitrarily selects is present and in this case, a meaning of the term will be disclosed in detail in a corresponding description part of the invention. Accordingly, a term used in the present invention should be defined based on not just a name of the term but a meaning of the term and contents throughout the present invention.

A singular form may include a plural form if there is no clearly opposite meaning in the context. Throughout the specification and the claims, unless explicitly described to the contrary, the word "comprise" and variations such as "comprises" or "comprising" will be understood to imply the inclusion of stated elements but not the exclusion of any other elements.

Hereinafter, exemplary embodiments of the present invention will be described in detail with reference to the accompanying drawings.

FIG. 1 is a diagram illustrating two types of optical display elements which can be manufactured by a method and a system for manufacturing an optical display element according to an exemplary embodiment of the present invention.

A panel W used in an optical display element manufactured by the present invention is a liquid crystal panel and may be a glass substrate unit in which a liquid crystal is positioned between a pair of glass substrates facing each other. Herein, the panel W may have a rectangular shape in which a long edge LE and a short edge are substantially orthogonal to each other.

In one plane P1 and the other plane P2 of the panel W, for convenience, a substrate disposed at a light source side of a liquid crystal cell of the pair of glass substrates will be described as one plane P1 of the panel W and a substrate viewed by an observer of the optical display element will be described as other plane P2 of the panel W.

The optical display element manufactured by the present invention may be classified into two types A and B according to whether a laminating direction in which an optical film (a sheet piece of the optical film) is laminated in any one direction of a long edge LE length direction of the panel W and a short edge SE length direction of the panel W is the long edge LE length direction or the short edge SE length direction based on one plane P1 of the panel W.

Hereinafter, based on one plane P1 of the panel W, the optical display element manufactured by laminating the optical film (the sheet piece of the optical film) in the short edge SE length direction will be described as an A type optical display element A and an optical display element manufactured by laminating the optical film (the sheet piece of the optical film) in the long edge LE length direction will be described as a B type optical display element B.

Herein, according to a type of optical display element to be manufactured, when the laminating direction in which the optical film (the sheet piece of the optical film) is laminated on one plane P1 of the panel W is determined as any one direction of the long edge LE length direction and the short edge SE length direction, the laminating direction in which the optical film (the sheet piece of the optical film) is laminated on the other plane P2 of the panel W may be determined as a different direction from the direction in which the optical film is laminated on one plane P1 of the panel W of the long edge LE length direction and the short edge SE length direction.

In the present invention, optical films F1' and F2' laminated on the panel W are elongated and two types of optical films F1' and F2' having different widths may be used. In addition, forms of the optical film substantially laminated on the panel W may be sheet pieces F1 and F2 of the optical film corresponding to the shapes of one plane P1 and the other plane P2 of the panel W.

Hereinafter, an optical film which is laminated in the short edge SE length direction while being formed with a width corresponding to the long edge LE of the panel W will be described as a first optical film F1' and an optical film which is laminated in the long edge LE length direction while being formed with a width corresponding to the short edge SE of the panel will be described as a second optical film F2'.

Herein, the "corresponding width" to the long edge LE and the short edge SE of the panel W means not only a case where the width of the optical film is "mathematically equal" to the length of the long edge LE and the length of the short edge SE of the panel W, but also "a case of substantially equal" and "a case where the width of the optical film is larger than the length of the long edge LE and the length of the short edge SE of the panel W by a predetermined length". When the optical film of "the case where the width of the optical film is larger than the length of the long edge LE and the length of the short edge SE of the panel W by a predetermined length" is used for laminating, the optical film may be cut in preparation for slight deformation of the optical film or according to an actual size of the panel after being laminated on the panel, thereby improving productivity of the optical display element.

The first optical film F1' and the second optical film F2' may have optical pattern directions which are the same as each other in respective length directions. For example, each of the optical films F1' and F2' may include a polarization plate (not illustrated) in which an absorption axis is formed in the length direction.

Herein, since the first optical film F1' is laminated on one plane of two planes of the panel W in the short edge SE length direction and the second optical film F2' is laminated on the other plane of the two planes of the panel W in the long edge LE length direction, optical pattern directions of the first optical film F1' and the second optical film F2' may be disposed to be orthogonal to each other with the panel interposed therebetween.

The two types of optical display elements (the A type optical display element A and the B type optical display element B) which may be manufactured by a method and a system for manufacturing an optical display element according to an exemplary embodiment of the present invention may correspond to a so-called O-mode optical display element and a so-called E-mode optical display element, respectively according to a relationship between an initial alignment direction of the liquid crystal cell and an absorption axis direction of the polarizing plate included in the optical film laminated on one plane P1 of the panel W.

Herein, the "initial alignment direction of the liquid crystal cell" means an alignment direction of the liquid crystal cell when power is not applied to the optical display element.

Herein, the 'O-mode optical display element' means an optical display element in which the initial alignment direction of the liquid crystal cell and the absorption axis direction of the polarizing plate included in the optical film laminated on one plane P1 of the panel W are parallel to each other, and the 'E-mode optical display element' may mean an optical display element in which the initial alignment direction of the liquid crystal cell and the absorption axis direction of the polarizing plate included in the optical film laminated on one plane P1 of the panel W are orthogonal to each other.

In the present invention, the 'parallel' means not only mathematically parallel but also substantially parallel, and the angle thereof is generally within ±2°, preferably within ±1° and more preferably within ±0.5°.

Further, the 'orthogonal' means not only mathematically orthogonal but also substantially orthogonal and the angle thereof is generally in a range of 90±2°, preferably 90±1°, and more preferably 90±0.5°.

In addition, the optical films F1' and F2' used in the present invention are stacked together with a release film and a surface protective film to form an optical film laminate. For example, an adhesive layer for laminating on the panel W is formed on one plane of the optical film, a release film for protecting the adhesive layer is formed, and a surface protective film may be formed on the other plane of the optical film by the adhesive layer interposed therebetween.

Figure 2:
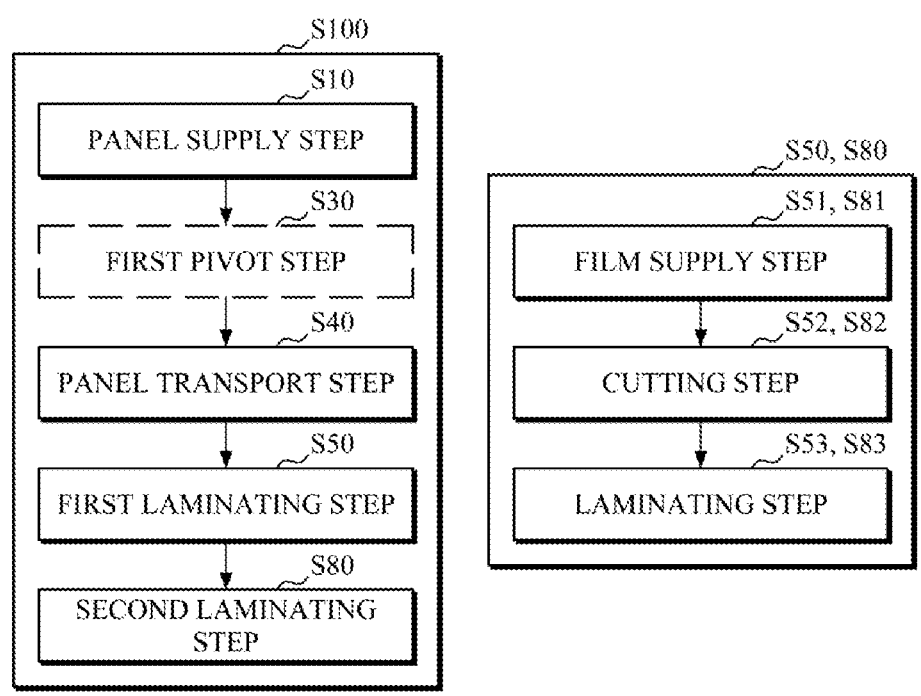
FIG. 2 is a block diagram illustrating an example of a method for manufacturing an optical display element according to an exemplary embodiment of the present invention.
Figure 3A:
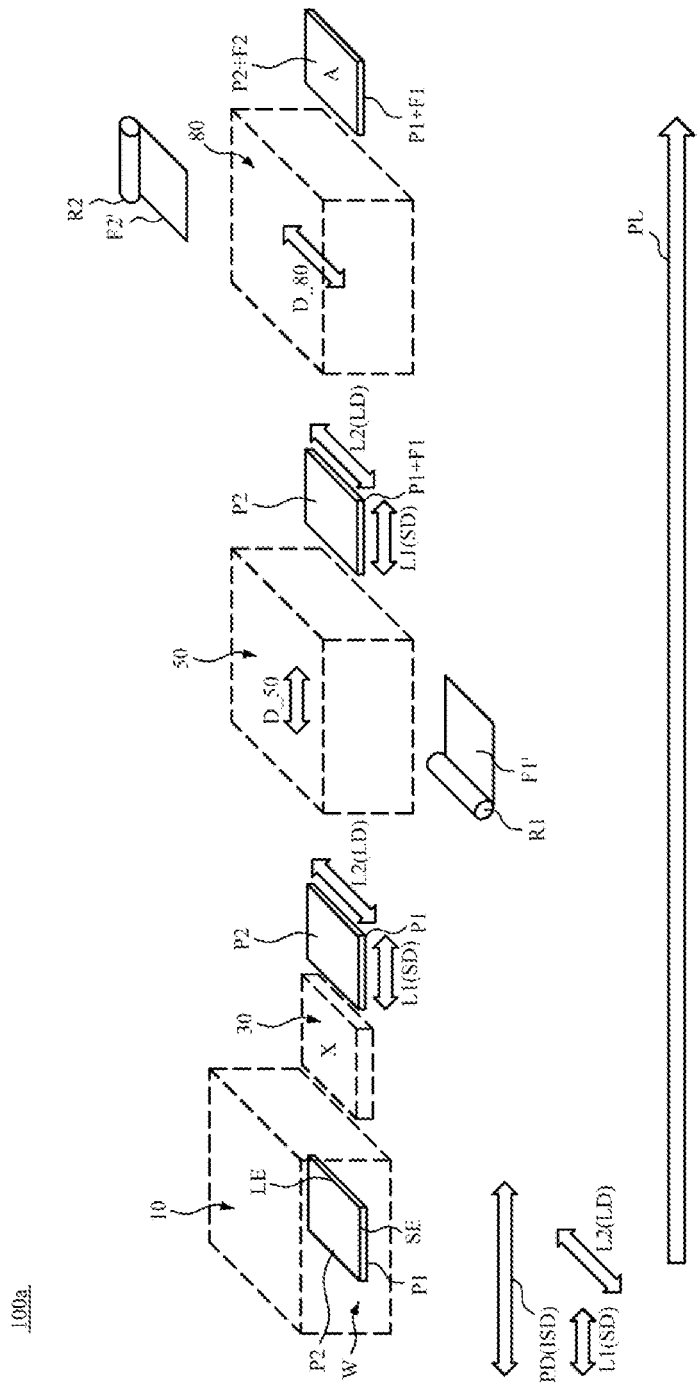
FIG. 3a is a schematic perspective view illustrating an example of manufacturing an A type optical display element by using the system for manufacturing an optical display element according to an exemplary embodiment of the present invention.
Figure 3B:
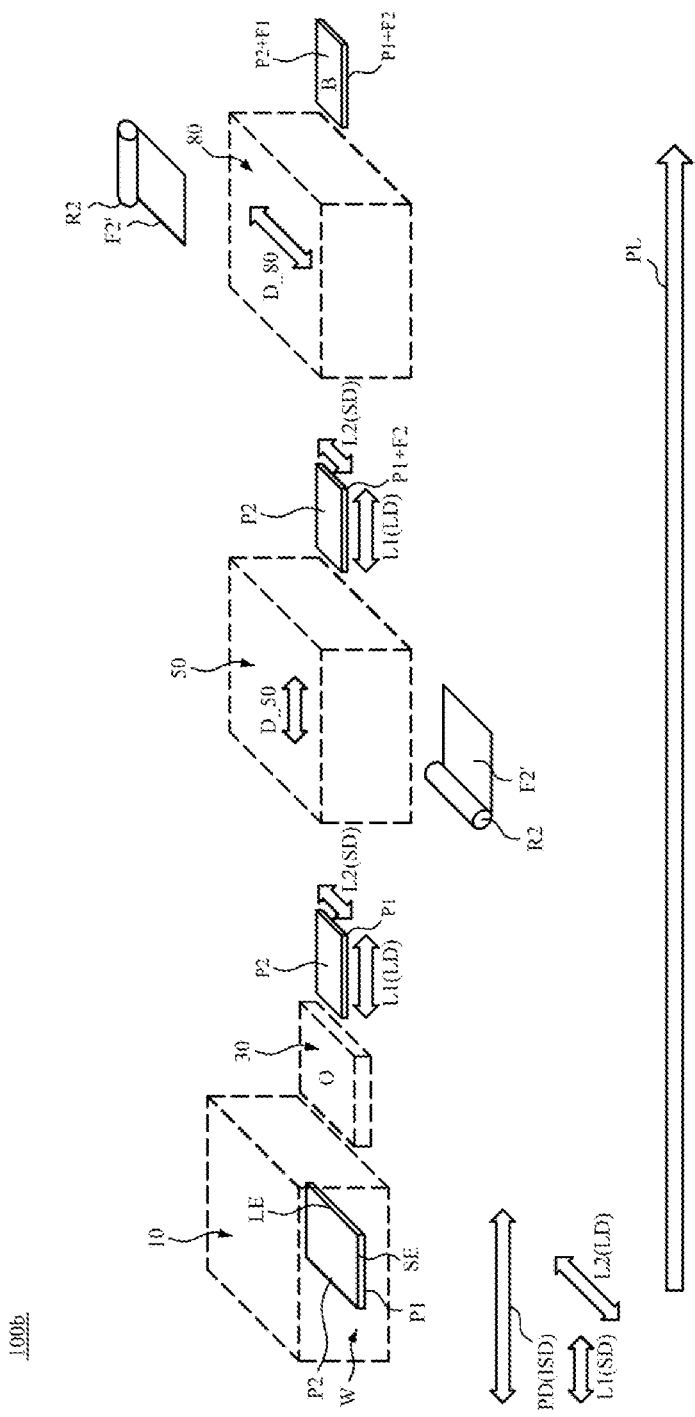
FIG. 3b is a schematic perspective view illustrating an example of manufacturing a B type optical display element by using the system for manufacturing an optical display element according to an exemplary embodiment of the present invention.
Figure 4A:
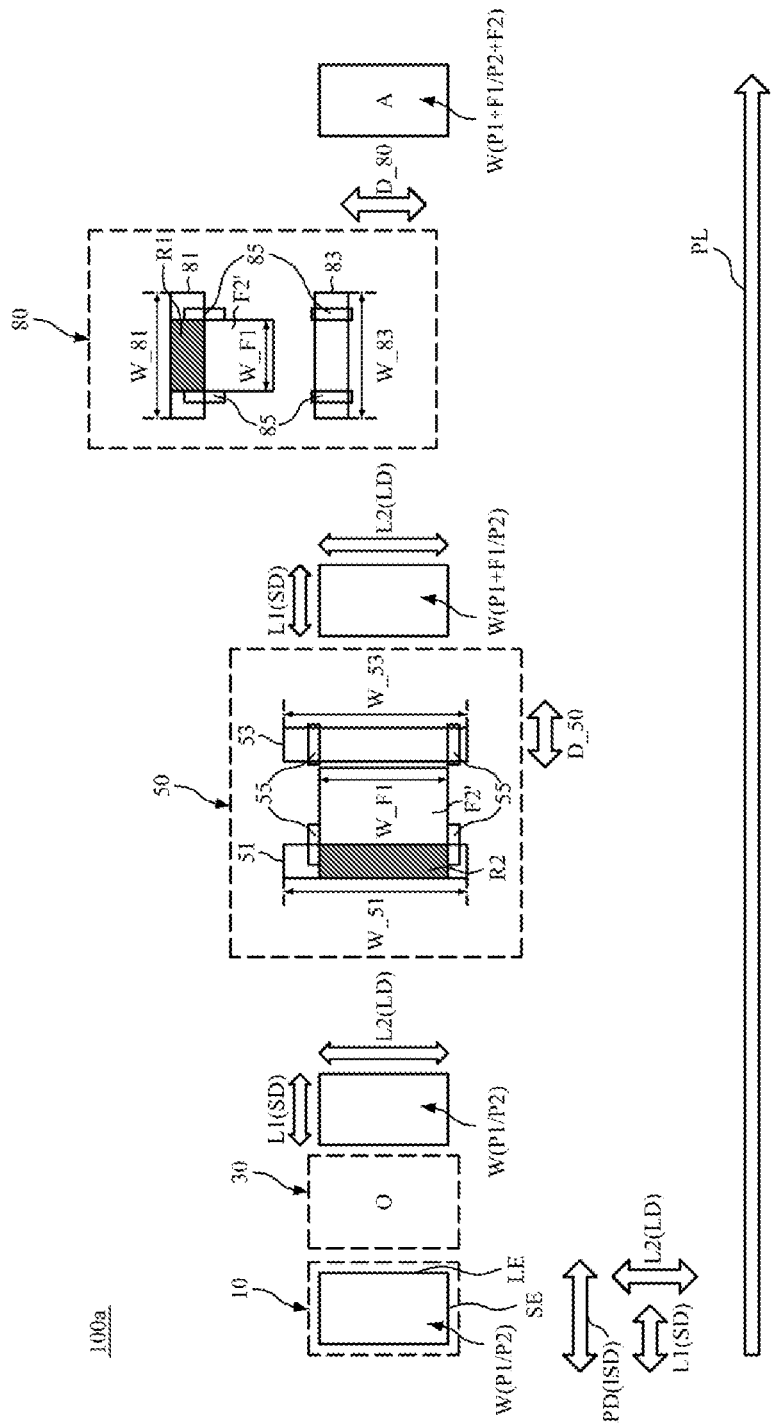
FIG. 4a is a schematic plan view illustrating an example of manufacturing the A type optical display element by using the system for manufacturing an optical display element according to an exemplary embodiment of the present invention.
Figure 4B:
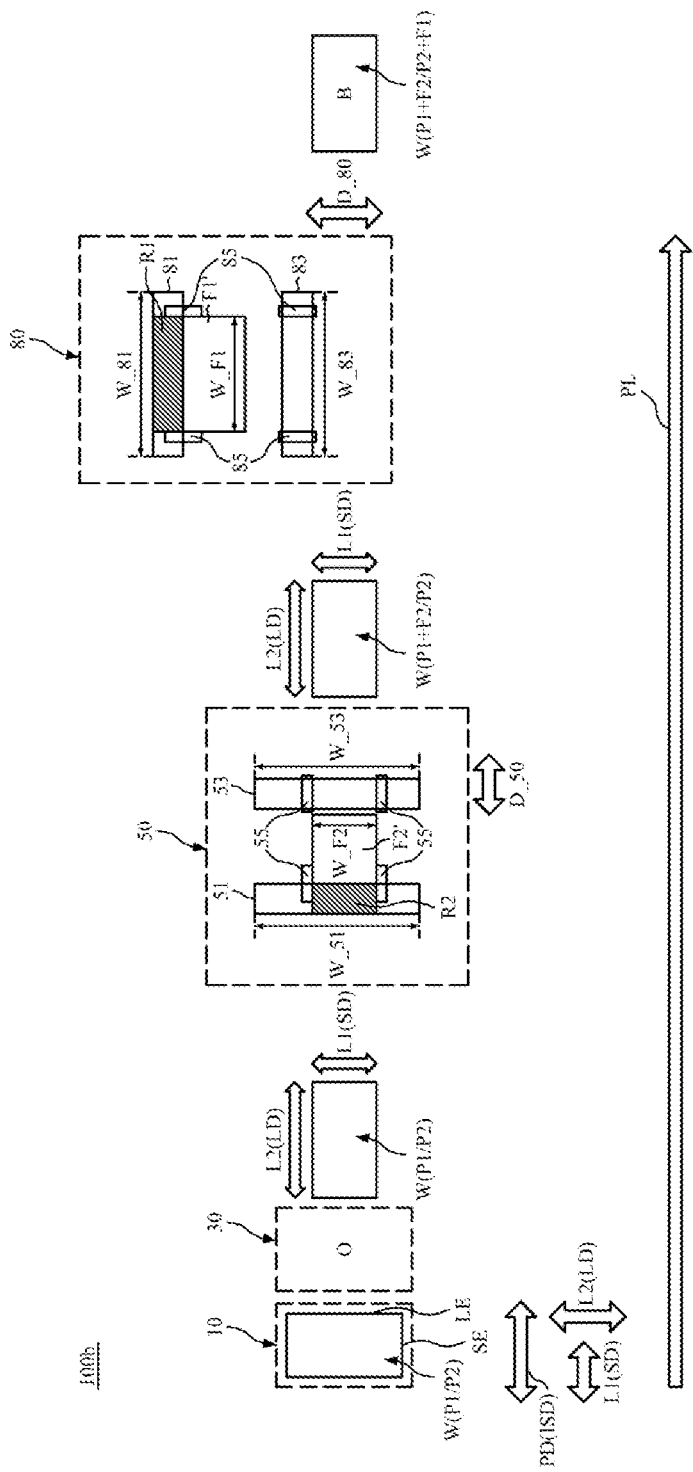
FIG. 4b is a schematic plan view illustrating an example of manufacturing the B type optical display element by using the system for manufacturing an optical display element according to an exemplary embodiment of the present invention.

FIG. 2 is a block diagram illustrating an example of a method for manufacturing an optical display element according to an exemplary embodiment of the present invention, FIG. 3A is a schematic perspective view illustrating an example of manufacturing an A type optical display element by using the system for manufacturing an optical display element according to an exemplary embodiment of the present invention, FIG. 3B is a schematic perspective view illustrating an example of manufacturing a B type optical display element by using the system for manufacturing an optical display element according to an exemplary embodiment of the present invention, FIG. 4A is a schematic plan view illustrating an example of manufacturing the A type optical display element by using the system for manufacturing an optical display element according to an exemplary embodiment of the present invention, and FIG. 4B is a schematic plan view illustrating an example of manufacturing the B type optical display element by using the system for manufacturing an optical display element according to an exemplary embodiment of the present invention.

A method (S100) for manufacturing an optical display element according to an exemplary embodiment of the present invention, which manufactures an optical display elements A and B by laminating optical films F1' and F2' on both planes P1 and P2 of a rectangular panel W, may include a panel supply step of supplying the panel W (S10); a first pivot step of selectively pivoting the panel W (S30); a panel transport step (S40); a first laminating step of laminating the optical film onto one plane P1 of the panel W (S50); and a second laminating step of laminating the optical film onto the other plane P2 of the panel W (S80).

Further, systems 100a and 100b of manufacturing an optical display element according to an exemplary embodiment of the present invention, as a system for manufacturing an optical display element which manufactures optical display elements A and B by laminating optical films F1' and F2' on both planes P1 and P2 of a rectangular panel W, respectively, may include a panel supply unit 10; a first pivot unit 30; a panel transport line PL; a first laminating unit 50; and a second laminating unit 80.

Herein, according to the configuration form of the system for manufacturing the optical display element of the present invention, a form (a straight line/a cross line) of the transport line PL of the panel W and an order (the first laminating unit 50, the second laminating unit 80/the second laminating unit 80, the first laminating unit 50) of the laminating unit of laminating the optical films corresponding to one plane P1 and the other plane P2 of the panel W, a position (upper side/lower side of the panel W) of laminating the optical films F1' and F2' by the first laminating unit 50 and the second laminating unit 80 at the upper side and the lower side of the panel W, and a direction (parallel to/crossing the transport line of the panel W) of supplying the optical films F1' and F2' to the transport line PL of the panel W by the first laminating unit 50 and the second laminating unit 80 may be determined.

As illustrated in FIGS. 3A and 3B, the systems 100a and 100b for manufacturing an optical display element according to the exemplary embodiment of the present invention may be configured in such a manner that a transport line PL of a panel W is a substantially straight line, a laminating unit laminating optical films F1' and F2' on one plane P1 of the panel W is a first laminating unit 50, a laminating unit laminating the optical films F1' and F2' on the other plane P2 of the panel W is a second laminating unit 80, a position onto which the first laminating unit 50 laminates the optical films F1' and F2' is a lower side of the panel W, a position onto which the second laminating unit 80 laminates the optical films F1' and F2' is an upper side of the panel W, a direction in which the first laminating unit 50 supplies the optical films F1' and F2' is a direction parallel to the transport line PL of the panel W, and a direction in which the second laminating unit 80 supplies the optical films F1' and F2' crosses the transport line PL of the panel W.

In the method (S100) for manufacturing the optical display element and the systems 100a and 100b for manufacturing the optical display element according to the exemplary embodiment of the present invention, a panel supply plane condition between one plane P1 and the other plane P2 of the panel W supplied by a panel supply unit 10, which is set to face the lower side of the panel; a condition of a panel supply direction PD set to be parallel to the transport line PL of the panel between a longitudinal direction ILD of an initial long edge LE and the longitudinal direction ISD of an initial short edge SE of the panel W supplied by the panel supply unit 10; and a laminating direction condition for a first laminating direction L1 set as a direction set in such a manner that the optical films F1' and F2' are laminated onto one plane P1 of the panel W and a second laminating direction L2 set as a direction set in such a manner that the optical films F1' and F2' are laminated onto the other plane P2 of the panel W in any one direction of the longitudinal direction LD of the long edge LE and the longitudinal direction SD of the short edge SE of the panel W may be pre-set as process conditions.

In the case of the systems 100a and 100b for manufacturing an optical display element, which are illustrated in FIGS. 3a, 3b, 4a, and 4b, a panel supply plane condition between one plane P1 and the other plane P2 of the panel W supplied by a panel supply unit 10, which faces the lower side of the panel W is set to be one plane P1 of the panel W and a condition of a panel supply direction PD set to be parallel to the transport line PL of the panel between a longitudinal direction ILD of an initial long edge LE and the longitudinal direction ISD of an initial short edge SE of the panel W supplied by the panel supply unit 10 is set to be the longitudinal direction ISD of the initial short edge SE of the panel.

Further, in the case of the system 100a for manufacturing an optical display element, which are illustrated in FIGS. 3a and 4a, the laminating direction condition is set in such a manner that a first laminating direction L1 set as a direction in which the optical films F1' and F2' are laminated onto one plane P1 of the panel W is set as a longitudinal direction SD of a short edge SE of the panel W and a second laminating direction L2 set as a direction in which the optical films F1' and F2' are laminated onto the other plane P2 of the panel W is set as a longitudinal direction LD of a long edge LE of the panel W. That is, the laminating direction condition corresponds to a condition in which an A type optical display element A may be manufactured.

On the contrary, in the case of the system 100a for manufacturing an optical display element, which are illustrated in FIGS. 3b and 4b, the laminating direction condition is set in such a manner that the first laminating direction L1 set as the direction in which the optical films F1' and F2' are laminated onto one plane P1 of the panel W is set as the longitudinal direction LD of the long edge LE of the panel W and the second laminating direction L2 set as the direction in which the optical films F1' and F2' are laminated onto the other plane P2 of the panel W is set as the longitudinal direction SD of the short edge SE of the panel W. That is, the laminating direction condition corresponds to the condition in which the B type optical display element B may be manufactured.

Herein, each of the two laminating direction conditions (the condition to manufacture the A type optical display element A/the condition to manufacture the B type optical display element B) may correspond to one of a condition to manufacture a so-called O mode optical display element and a condition to manufacture a so-called E mode optical display element according to a relationship between an initial alignment direction of liquid crystal cells and an absorption axis direction of a polarization plate included the optical film laminated on one plane P1 of the panel W.

An example of manufacturing the two types of optical display elements will be described by using the method for manufacturing the optical display element and the system for manufacturing the optical display element according to the exemplary embodiment of the present invention based on FIGS. 2, 3a to 3b, and 4a to 4b.

In the panel supply step (S10), the panel W may be supplied to be maintained in a horizontal state by the panel supply unit 10. In the systems 100a and 100b for manufacturing the optical display element illustrated in FIGS. 3a and 3b, the panel W is supplied by the panel supply unit 10 so that one plane P1 faces the lower side of the panel W and the longitudinal direction ISD of the initial short edge SE of the panel W is parallel to the transport line PL of the panel W, by a panel supply plane condition set so that the surface facing the lower side of the panel W may be one plane P1 of the panel W; and a panel supply direction PD condition set so that the direction parallel to the transport line PL of the panel W may be the longitudinal direction ISD of the initial short edge SE of the panel W.

In the first pivot step (S30), when the set panel supply direction PD is orthogonal to the set first laminating direction L1, the panel W is pivoted by the first pivot unit 30 to reverse a positional relationship between the initial long edge LE and the initial short edge SE of the panel W supplied by the panel supply unit 10 to each other.

In the system 100a for manufacturing the optical display element illustrated in FIG. 3a, by the laminating direction condition set (that is, a condition to manufacture the A type optical display element A) in such a manner that a first laminating direction L1 set as a direction in which the optical films F1' and F2' need to be laminated onto one plane P1 of the panel W is set as a longitudinal direction SD of a short edge SE of the panel W and a second laminating direction L2 set as a direction in which the optical films F1' and F2' are laminated onto the other plane P2 of the panel W is set as a longitudinal direction LD of a long edge LE of the panel W, since the set panel supply directions PD and ISD are parallel to the set first laminating directions L1 and SD, the first pivot unit 30 does not pivot the panel W.

On the contrary, in the system 100b for manufacturing the optical display element illustrated in FIG. 3a, by the laminating direction condition (that is, the condition capable of manufacturing the B type optical display element B) set in such a manner that a first laminating direction L1 in which the optical films F1' and F2' are to be laminated onto one plane P1 of the panel W is set as a longitudinal direction SD of the long edge LE of the panel W and a second laminating direction L2 in which the optical films F1' and F2' are to be laminated onto the other plane P2 of the panel W is set as a longitudinal direction SD of a short edge SE of the panel W, since the set panel supply directions PD and ISD are orthogonal to the set first laminating directions L1 and LD, the first pivot unit 30 pivots the panel W.

In other words, in the systems 100a and 100b for manufacturing the optical display element illustrated in FIGS. 3a and 3b, since the first laminating unit 50 is configured to laminate the optical films F1' and F2' in the direction parallel to the transport line PL of the panel W, in the case 100b where the process condition to manufacture the B type optical display element B is preset, the panel W is pivoted by the first pivot unit 30 so that the first laminating directions L1 and LD and the transport line PL of the panel W are maintained to be parallel to each other and the panel W may be transported to the first laminating unit 50.

In the panel transport step (S40), by a panel transport unit (not illustrated), the panel W supplied in the panel supply step S10 may be transported to respective units 30, 40, and 50 in order of the first pivot unit 30, the first laminating unit 50, and the second laminating unit 80.

In the first laminating step S50, by the first laminating unit 50, the optical films F1' and F2' may be laminated on one plane P1 of the panel W in a direction D_50 parallel to the transport line PL of the panel W. In the first laminating step (S50), based on the laminating direction condition of the process conditions, any one of the first optical film F1' and the second optical film F2' may be used.

In the systems 100a and 100b for manufacturing the optical display element illustrated in FIGS. 3a and 3b, the first laminating unit 50 is configured to laminate the optical films F1' and F2' in the direction D_50 parallel to the transport line PL of the panel W at the lower side of the panel W.

As a case in which the optical display element manufacturing system 100a illustrated in FIG. 3a needs to manufacture the A type optical display element A, since the first laminating direction L1 set as the direction in which the optical films F1' and L1' are laminated on one plane P1 of the panel W in the laminating direction condition is the short-edge (SE) longitudinal direction SD of the panel W, in the first laminating step S50, the first optical film F1' formed with a width W_F1 corresponding to the long edge LE of the panel W is used to be laminated on one plane P1 of the panel W in the short-edge (SE) longitudinal direction SD of the panel W.

As a case in which the optical display element manufacturing system 100b illustrated in FIG. 3b needs to manufacture the B type optical display element B, since the first laminating direction L1 set as the direction in which the optical films F1' and L1' are laminated on the one plane P1 of the panel W in the laminating direction condition is the long-edge (LE) longitudinal direction LD of the panel W, in the first laminating step S50, the second optical film F2' formed with a width W_F2 corresponding to the short edge SE of the panel W is used to be laminated on one plane of the panel W in the long-edge (LE) longitudinal direction LD of the panel W.

In the second laminating step (S80), by the second laminating unit 80, the optical films F1' and F2' may be laminated on the other plane P2 of the panel W in a direction D_80 in which absorption axis direction orthogonal to the absorption axis direction of the optical films F1' and F2' laminated onto one plane P1 of the panel W may be formed. In the second laminating step (S80), based on the laminating direction condition of the process conditions, any one of the first optical film F1' and the second optical film F2' may be used.

In the systems 100*a* and 100*b* for manufacturing the optical display element illustrated in FIGS. 3*a* and 3*b*, the second laminating unit 50 is configured to laminate the optical films F1' and F2' in a direction D_80 orthogonal to the transport direction PL of the panel W at the upper side of the panel W.

As a case in which the optical display element manufacturing system 100*a* illustrated in FIG. 3*a* needs to manufacture the A type optical display element A, since the second laminating direction L2 set as the direction in which the optical films F1' and F2' are laminated on the other plane P2 of the panel W in the laminating direction condition is the long-edge (LE) longitudinal direction LD of the panel W, in the second laminating step S80, the second optical film F2' formed with a width W_F2 corresponding to the short edge SE of the panel W is used to be laminated on the other plane P2 of the panel W in the long-edge (LE) longitudinal direction LD of the panel W.

As a result, the A type optical display element A may be manufactured, in which the optical film is laminated in the short-edge (SE) longitudinal direction SD based on one plane P1 of the panel W and the optical film is laminated in the long-edge (LE) longitudinal direction LD based on the other plane P2 of the panel W.

As a case in which the system 100*b* for manufacturing the optical display element illustrated in FIG. 3*b* needs to manufacture the B type optical display element B, since the second laminating direction L2 set as the direction in which the optical films F1' and F2' are laminated on the other plane P2 of the panel W in the laminating direction condition is the short-edge (SE) longitudinal direction SD of the panel W, in the second laminating step S80, the first optical film F1' formed with a width W_F1 corresponding to the long edge LE of the panel W is used to be laminated on the other plane P2 of the panel W in the short-edge (SE) longitudinal direction SD of the panel W.

As a result, the B type optical display element B may be manufactured, in which the optical film is laminated in the long-edge (LE) longitudinal direction LD based on one plane P1 of the panel W and the optical film is laminated in the short-edge (SE) longitudinal direction SD based on the other plane P2 of the panel W.

Herein, the first laminating step S50 and the second laminating step S80 may include optical film supply steps S51 and S81 of unrolling and supplying the optical films F1' and F2' from film rolls R1 and R2 on which the elongated optical films F1' and F2' are rolled, cutting steps S52 and S82 of cutting the optical films F1' and F2' unrolled and supplied from the fill rolls R1 and R2 in a width direction to form optical film sheet pieces F1 and F2, and a-laminating steps S53 and S83 of laminating the optical film sheet pieces F1 and F2 on one of one plane P1 and the other plane P2 of the panel W.

Particularly, the first laminating step (S50) may include a first optical film supply step (S51) of unrolling and supplying, by a first optical film supply section 51, the optical films F1' and F2' from the film rolls R1 and R2 on which the elongating optical films F1' and F2' are rolled; a cutting step of forming optical film sheet pieces F1 and F2 by cutting (so-called, half cutting), by a first cutting section (no illustrated), the optical films F1' and F2' unrolled and supplied from the film rolls R1 and R2 in a width direction (S52); and a 1a-th laminating step of laminating, by the first laminating section 55, the optical films F1' and F2' or the optical film sheet pieces F1 and F2 supplied from the first optical film supply section 51 on one plane P1 of the panel W (S53).

The first laminating unit 50 performing the first laminating step (S50) may include a first optical film supply section 51 (only illustrated conceptually) for performing the first optical film supply step (S51); a first cutting section (not illustrated) for performing the cutting step (S52); a first laminating section 53 for performing the 1a-th laminating step; and a first stroke adjusting section 55 capable of adjusting a stroke of at least one of the first optical film supply section 51, the first cutting unit (not illustrated), and the first laminating section 53 with a width corresponding to the width W_F1 of the first optical film F1' or the width W_F2 of the second optical film F2' so that both the first optical film F1' and the second optical film F2' may be selectively applied in the first optical film supply section 51, the second cutting unit (not illustrated), and the first laminating section 53.

The first optical film supply section 51 may include a first installation roller (not illustrated) in which the film rolls R1 and R2 may be installed, and a first transport roller (not illustrated) capable of transporting the optical films F1' and F2' unrolled from the film rolls R1 and R2, and the width W_51 of each element may be formed to correspond to the widths W_F1 and W_F2 of both the first optical film F1' and the second optical film F2'.

The first cutting section (not illustrated) may include a first cutting means (for example, a laser or a circular blade) which cuts (so-called, half-cuts) the optical films F1 'and F2' unrolled and supplied from the film rolls R1 and R2 in the width direction to form the optical film sheet pieces F1 and F2 and a cutting path of the first cutting means may be adjusted so as to correspond to the widths W_F1 and W_F2 of both the first optical film F1' and the second optical film F2'.

The first laminating section 53 may include a pair of first laminating rollers which are disposed with the panel W interposed therebetween and a width W_53 of the first laminating roller may be formed to correspond to the widths W_F1 and W_F2 of both the first optical film F1' and the second optical film F2'.

The first stroke adjusting section 55 may include a pair of guide members which are installed in the first optical film supply section 51 and the first laminating section 53 and may support both sides of the optical films F1' and F2', and a distance between the pair of guide members may be variable so that the strokes of the first optical film supply section 51 and the first laminating section 53 may be adjusted.

Further, the second laminating step (S80) may include a second optical film supply step (S81) of unrolling and supplying, by a second optical film supply section 81, the optical films F1' and F2' from the film rolls R1 and R2 on which the elongated optical films F1' and F2' are rolled; a cutting step of forming, by a second cutting section (not illustrated), optical film sheet pieces F1 and F2 by cutting (so-called, half cutting) the optical films F1' and F2' unrolled and supplied from the film rolls R1 and R2 in a width direction (S82); and a 2a-th laminating step of laminating, by a second laminating section 85, the optical films F1' and F2' or the optical film sheet pieces F1 and F2 supplied from the second optical film supply section 81 on the other plane P2 of the panel W (S83).

The second laminating unit 80 performing the second laminating step (S80) may include a second optical film supply section 81 (only illustrated conceptually) for performing the second optical film supply step (S81); a second cutting unit (not illustrated) for performing the cutting step (S82); a second laminating section 83 for performing the 2a-th laminating step; and a stroke adjusting section 85 capable of adjusting a stroke of at least one of the second optical film supply section 81, the second cutting unit (not illustrated), and the second laminating section 83 with a width corresponding to the width W_F1 of the first optical film F1' or the width W_F2 of the second optical film F2' so that both the first optical film F1' and the second optical film F2' may be selectively applied in the second optical film supply section 81, the second cutting unit (not illustrated), and the second laminating section 83.

The second optical film supply section 81 may include a second installation roller (not illustrated) in which the film rolls R1 and R2 may be installed, and a second transport roller (not illustrated) capable of transporting the optical films F1' and F2' unrolled from the film rolls R1 and R2, and the width W_81 of each element may be formed to correspond to the widths W_F1 and W_F2 of both the first optical film F1' and the second optical film F2'.

The second cutting section (not illustrated) may include a second cutting means (for example, a laser or a circular blade) which cuts (so-called, half-cuts) the optical films F1 'and F2' unrolled and supplied from the film rolls R1 and R2 in the width direction to form the optical film sheet pieces F1 and F2 and a cutting path of the second cutting means may be adjusted so as to correspond to the widths W_F1 and W_F2 of both the first optical film F1' and the second optical film F2'.

The second laminating section 83 may include a pair of second laminating rollers which are disposed with the panel W interposed therebetween and a width W_53 of the second laminating roller may be formed to correspond to the widths W_F1 and W_F2 of both the first optical film F1' and the second optical film F2'.

The second stroke adjusting section 85 may include a pair of guide members which are installed in the second optical film supply section 81 and the second laminating unit 83 and may support both sides of the optical films F1' and F2', and a distance between the pair of guide members may be variable so that the strokes of the second optical film supply section 81 and the second laminating unit 83 may be adjusted.

As the case where the system 100a for manufacturing the optical display element illustrated in FIG. 4a needs to manufacture the A type optical display element A, the stroke of each element is adjusted with a width corresponding to the width W_F1 of the first optical film F1' so that the first laminating unit 50 laminates the first optical film F1' on one plane P1 of the panel W in the short-edge (SE) longitudinal direction SD of the panel W, and the stroke of each element is adjusted with a width corresponding to the width W_F2 of the second optical film F2' so that the second laminating unit 80 laminates the second optical film F2' on the other plane P2 of the panel W in the long-edge (LE) longitudinal direction LD of the panel W.

As the case where the system 100b for manufacturing the optical display element illustrated in FIG. 4b needs to manufacture the B type optical display element B, the stroke of each element is adjusted with a width corresponding to the width W_F2 of the second optical film F2' so that the first laminating unit 50 laminates the second optical film F2' on one plane P1 of the panel W in the long-edge (LE) longitudinal direction LD of the panel W and the stroke of each element is adjusted with a width corresponding to the width W_F1 of the first optical film F1' so that the second laminating unit 80 laminates the first optical film F1' on the other plane P2 of the panel W in the short-edge (SE) longitudinal direction SD of the panel W.

According to the method S100 and the systems 100a and 100b for manufacturing the optical display element according to the exemplary embodiment of the present invention described above, when the set panel supply direction PD is orthogonal to the first laminating direction L1 set in a direction of laminating the optical films F1' and F2' on one plane P1 of the panel W, the panel W is pivoted by the first pivot unit 30, and as a result, positional relationships between an initial long edge LE and an initial short edge SE of the panel W supplied by the panel supply unit 10 may be reversed to each other. Herein, since the first laminating direction L1 is the process condition selectively set from the long edge (LE) longitudinal direction LD and the short edge (SE) longitudinal direction SD of the panel W according to the types A and B of the optical display element to be manufactured, there is an advantage in that it is possible to manufacture at least two type of optical display elements (the A type optical display element A and the B type optical display element B) by a single manufacturing line.

Figure 5:
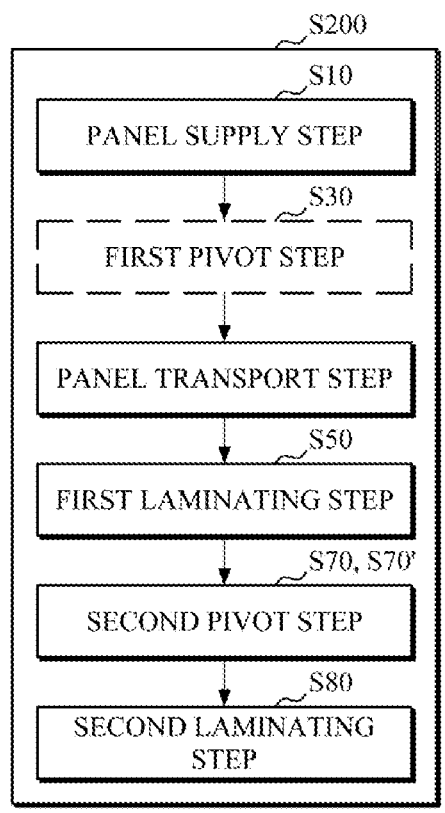
FIG. 5 is a block diagram illustrating an example of a method for manufacturing an optical display element according to a second or third exemplary embodiment of the present invention.
Figure 6A:
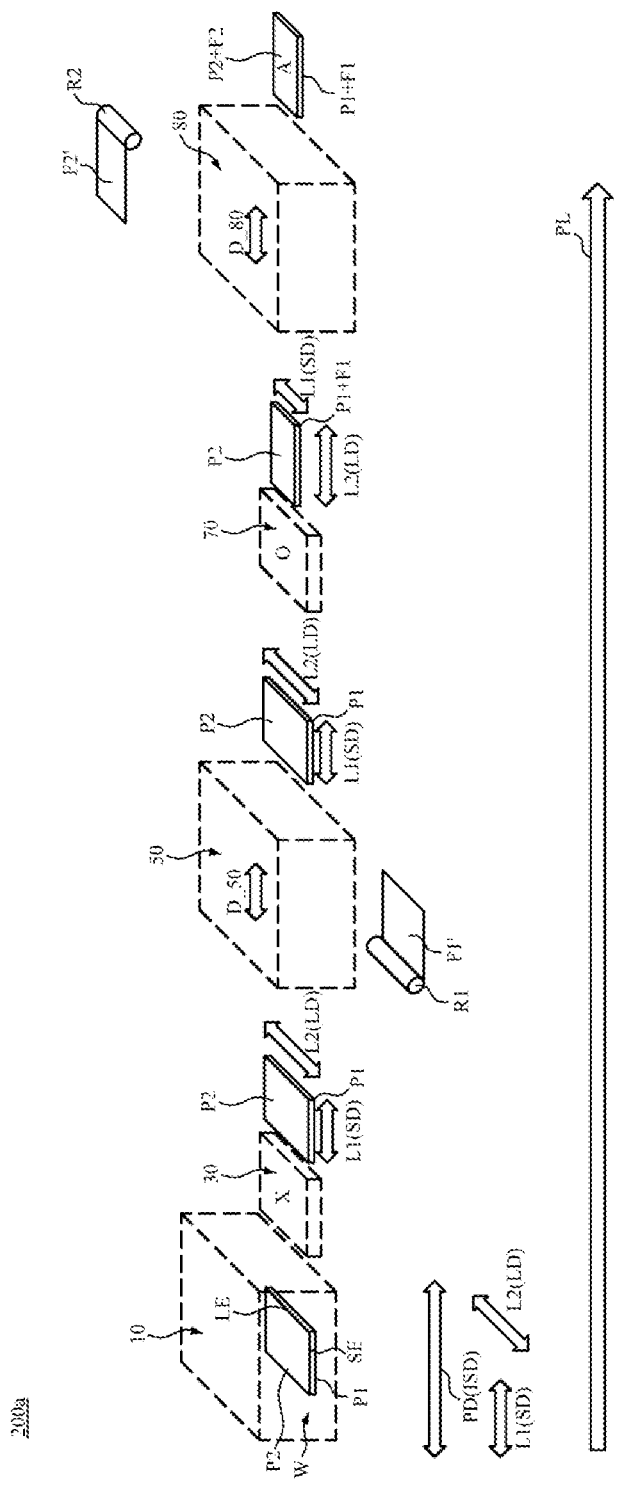
FIG. 6a is a schematic perspective view illustrating an example of manufacturing an A type optical display element by using a system for manufacturing an optical display element according to the second exemplary embodiment of the present invention.
Figure 6B:
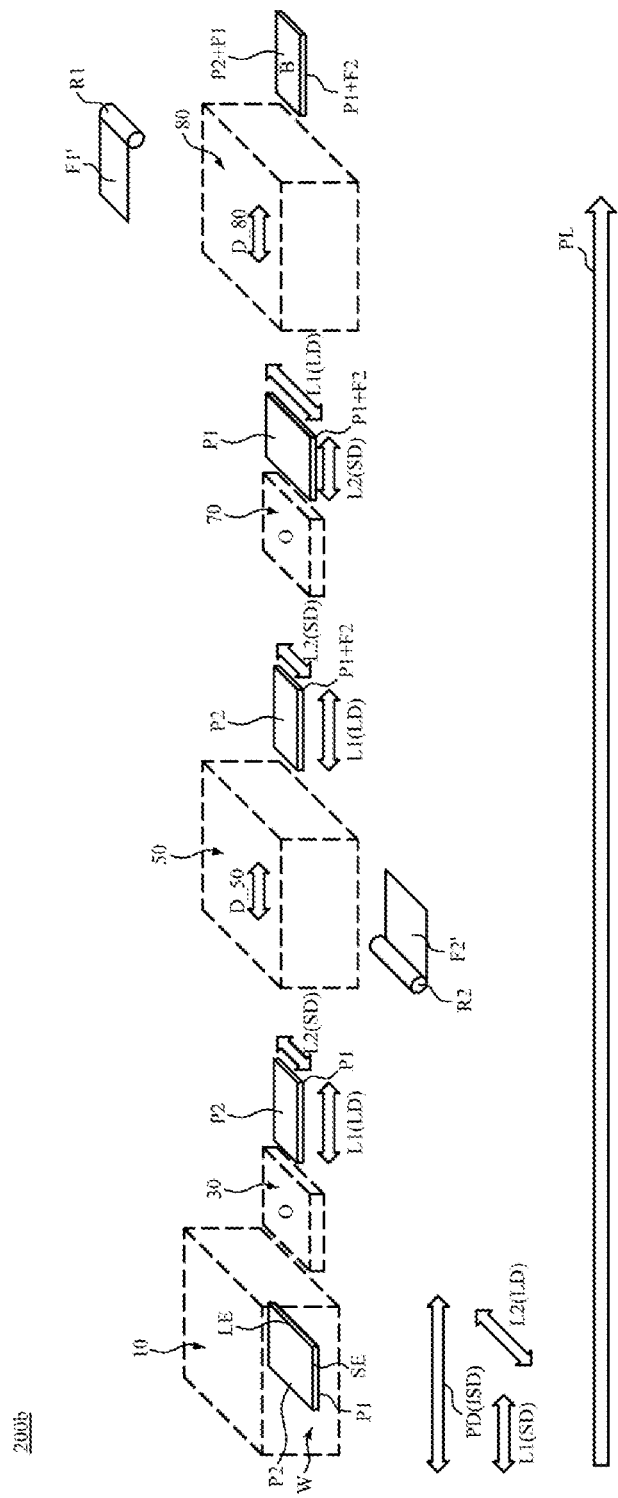
FIG. 6b is a schematic perspective view illustrating an example of manufacturing a B type optical display element by using the system for manufacturing an optical display element according to the second exemplary embodiment of the present invention.
Figure 7A:
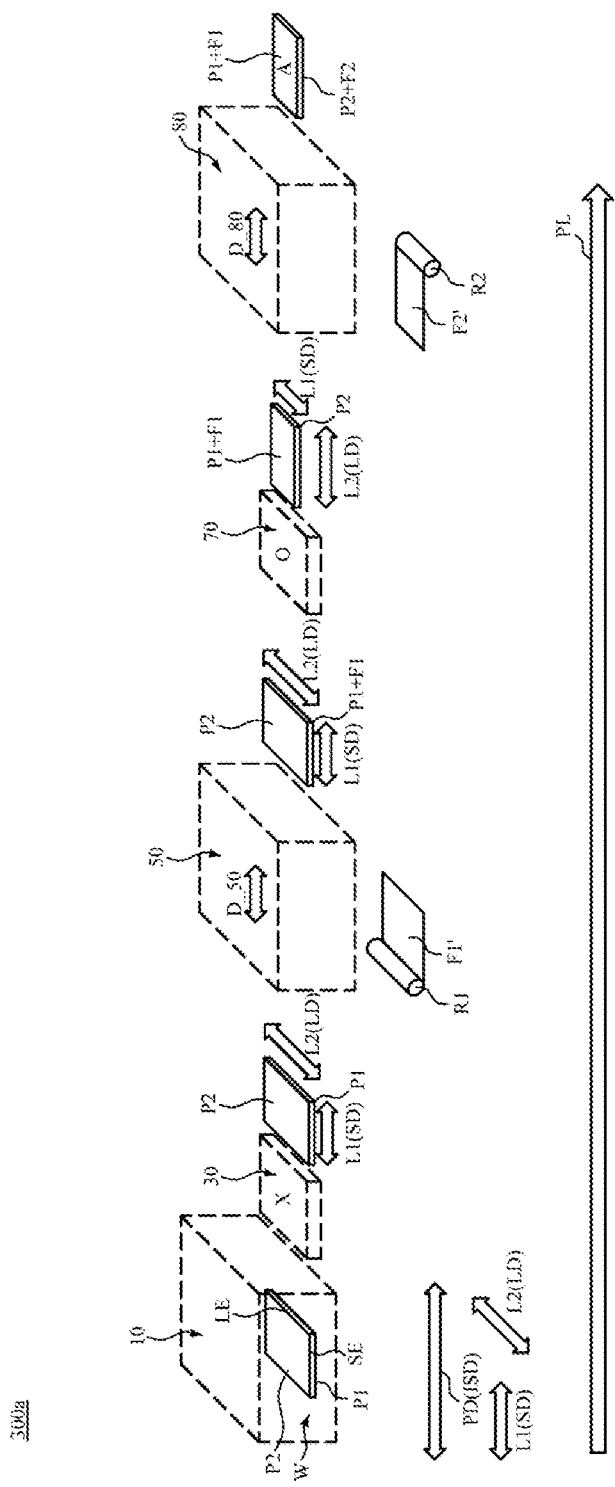
FIG. 7a is a schematic perspective view illustrating an example of manufacturing the A type optical display element by using the system for manufacturing an optical display element according to the third exemplary embodiment of the present invention.
Figure 7B:
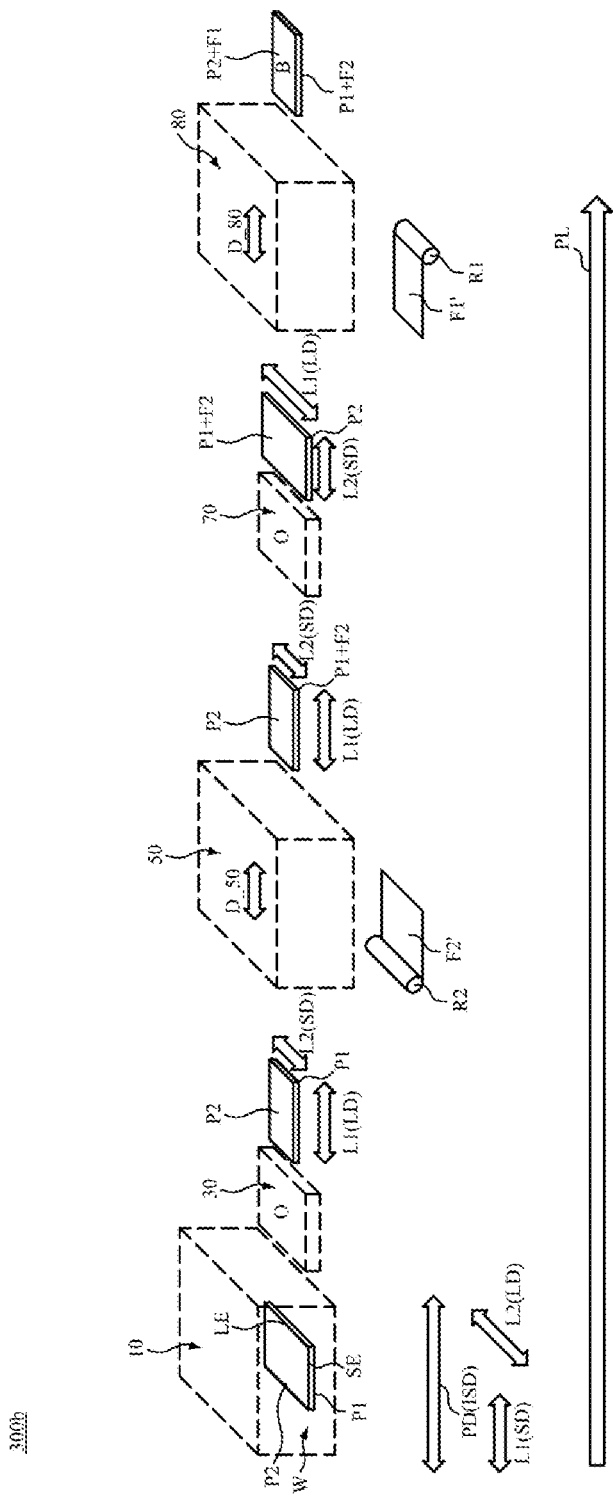
FIG. 7b is a schematic perspective view illustrating an example of manufacturing the B type optical display element by using the system for manufacturing an optical display element according to the third exemplary embodiment of the present invention.
Figure 8A:
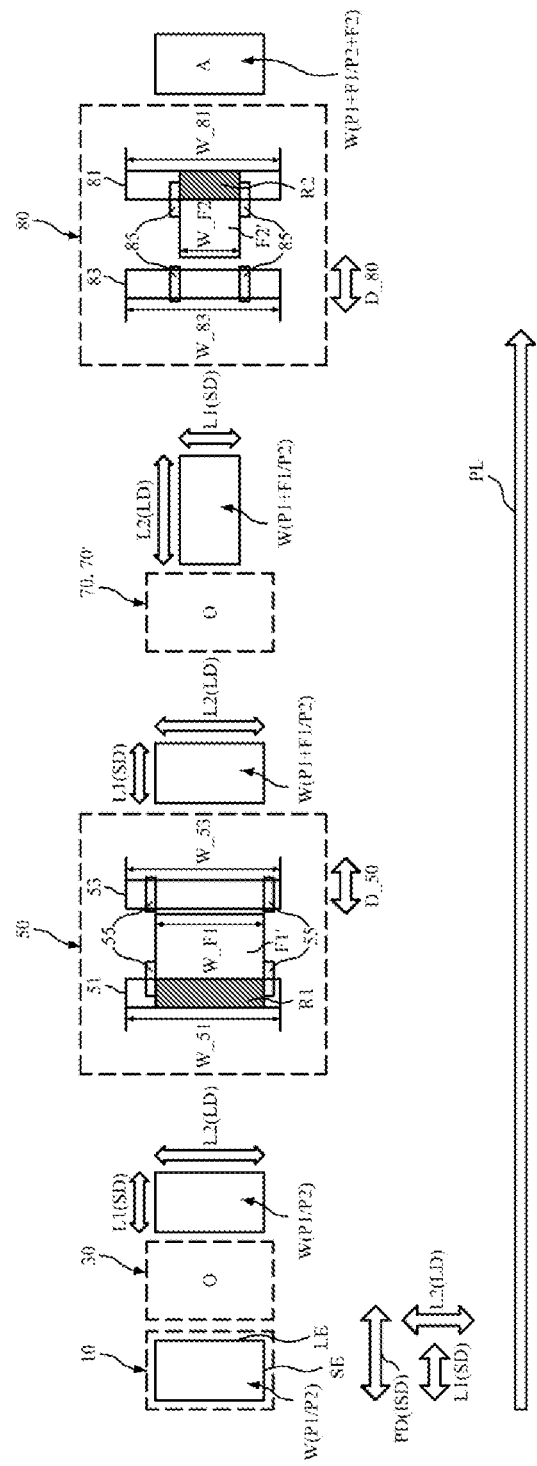
FIG. 8a is a schematic plan view illustrating an example of manufacturing the A type optical display element by using the system for manufacturing an optical display element according to the second or third exemplary embodiment of the present invention.
Figure 8B:
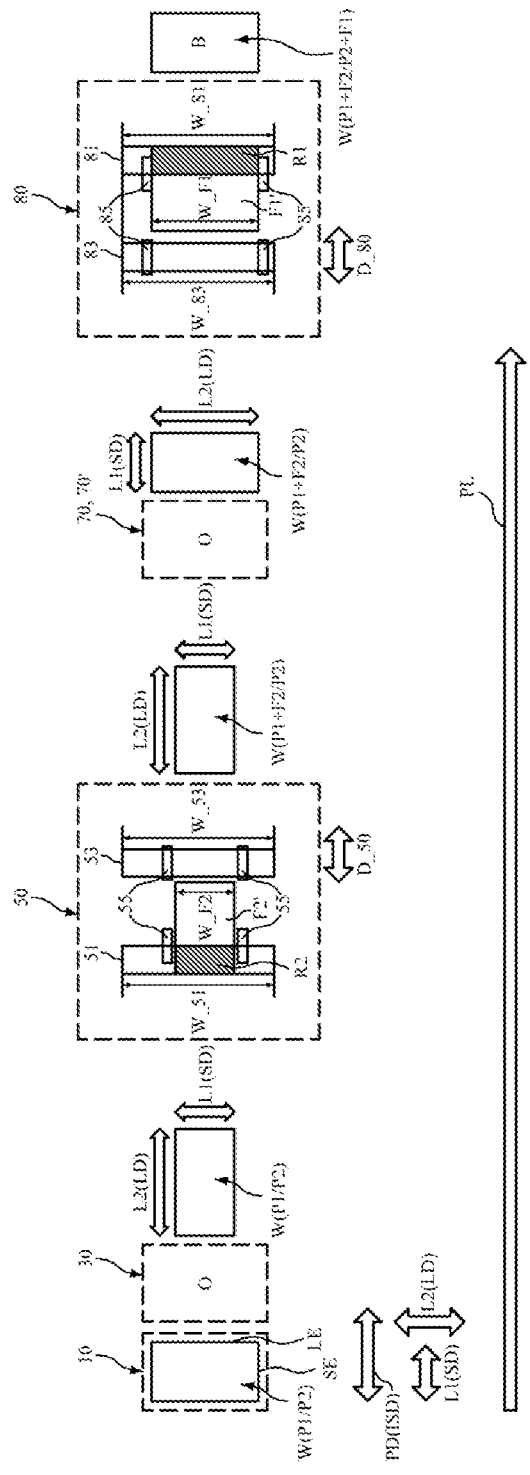
FIG. 8b is a schematic plan view illustrating an example of manufacturing the B type optical display element by using the system for manufacturing an optical display element according to the second or third exemplary embodiment of the present invention.

FIG. 5 is a block diagram illustrating an example of a method for manufacturing an optical display element according to the second or third exemplary embodiment of the present invention, FIG. 6a or 7a is a schematic perspective view illustrating an example of manufacturing an A type optical display element by using a system for manufacturing an optical display element according to the second or third exemplary embodiment of the present invention, FIG. 6b or 7b is a schematic perspective view illustrating an example of manufacturing a B type optical display element by using the system for manufacturing an optical display element according to the second exemplary embodiment of the present invention, FIG. 8a is a schematic plan view illustrating an example of manufacturing the A type optical display element by using the system for manufacturing an optical display element according to the second or third exemplary embodiment of the present invention, and FIG. 8b is a schematic plan view illustrating an example of manufacturing the B type optical display element by using the system for manufacturing an optical display element according to the second or third exemplary embodiment of the present invention.

The method (S100) for manufacturing an optical display element, which manufactures optical display elements A and B by laminating optical films F1' and F2' on both planes P1 and P2 of a rectangular panel W according to the second or third exemplary embodiment of the present invention may include a panel supply step S10 of supplying the panel W; a first pivot step S30 of selectively pivoting the panel W; a panel transport step S40; a first laminating step S50 of laminating the optical film onto one plane P1 of the panel W; a second pivot step S70, S70' of pivoting the panel W; and a second laminating step S80 of laminating the optical film onto the other plane P2 of the panel W. Further, the systems 200a and 200b or 300a and 300b for manufacturing an optical display element according to the second or third exemplary embodiment of the present invention, which manufacture optical display elements A and B by laminating optical films F1' and F2' on both planes P1 and P2 of a rectangular panel W, may include a panel supply unit 10; a first pivot unit 30, a panel transport line PL; a first laminating unit 50; a second pivot unit 70, 70'; and a second laminating unit 80.

The systems 200a and 200b for manufacturing an optical display element according to the second exemplary embodiment of the present invention may be configured in such a manner that a transport line PL of a panel W is a substantially straight line, a laminating unit laminating optical films F1' and F2' on one plane P1 of the panel W is a first laminating unit 50, a laminating unit laminating the optical films F1' and F2' on the other plane P2 of the panel W is a second laminating unit 80, a position onto which the first laminating unit 50 laminates the optical films F1' and F2' is a lower side of the panel W, a position onto which the second laminating unit 80 laminates the optical film F1' and F2' is an upper side of the panel W, a direction in which the first laminating unit 50 supplies the optical films F1' and F2' is parallel to the transport line PL of the panel W, and a direction in which the second laminating unit 80 supplies the optical films F1' and F2' is also parallel to the transport line PL of the panel W, as illustrated in FIGS. 6*a* and 6*b*.

In the case of the systems 200*a* and 200*b* for manufacturing an optical display element, which are illustrated in FIGS. 6*a* and 6*b*, a panel supply plane condition between one plane P1 and the other plane P2 of the panel W supplied by a panel supply unit 10, which faces the lower side of the panel W is set to be one plane P1 of the panel W and a condition of a panel supply direction PD set to be parallel the transport line PL of the panel between a longitudinal direction ILD of an initial long edge LE and the longitudinal direction ISD of an initial short edge SE of the panel W supplied by the panel supply unit 10 is set to be the longitudinal direction ISD of the initial short edge SE of the panel.

Further, in the case of the system 200*a* for manufacturing an optical display element, which are illustrated in FIGS. 6*a* and 7*a*, the laminating direction condition is set in such a manner that a first laminating direction L1 set as a direction in which the optical films F1' and F2' are laminated onto one plane P1 of the panel W is set as a longitudinal direction SD of a short edge SE of the panel W and a second laminating direction L2 set as a direction in which the optical films F1' and F2' are laminated onto the other plane P2 of the panel W is set as a longitudinal direction LD of a long edge LE of the panel W. That is, the laminating direction condition corresponds to a condition in which an A type optical display element A may be manufactured.

On the contrary, in the case of the system 200*b* for manufacturing an optical display element, which are illustrated in FIGS. 6*b* and 7*b*, the laminating direction condition is set in such a manner that the first laminating direction L1 set as the direction in which the optical films F1' and F2' are laminated onto one plane P1 of the panel W is set as the longitudinal direction LD of the longitudinal direction LE of the panel W and the second laminating direction L2 set as the direction in which the optical films F1' and F2' are laminated onto the other plane P2 of the panel W is set as the longitudinal direction SD of the short edge SE of the panel W. That is, the laminating direction condition corresponds to a condition in which a B type optical display element B may be manufactured.

Herein, each of the two laminating direction conditions (the condition to manufacture the A type optical display element A/the condition to manufacture the B type optical display element B) may correspond to one of a condition to manufacture a so-called O mode optical display element and a condition to manufacture a so-called E mode optical display element according to a relationship between an initial alignment direction of liquid crystal cells and an absorption axis direction of a polarization plate included in the optical film laminated on one plane P1 of the panel W.

The panel supply steps S10 to the first laminating step S50 of the second exemplary embodiment pass the same process as the panel supply step S10 to the first laminating step S50 in the exemplary embodiment on the whole.

In detail, in the panel supply step S10 to the first laminating step S50, as a case in which the system 200*a* for manufacturing an optical display element, which is illustrated in FIGS. 6*a* and 7*a* needs to manufacture the A type optical display element A, the system 200*a* passes the same process as the optical display element manufacturing system 100*a* illustrated in FIGS. 3*a* and 4*a* and as a case in which the system 200*b* for manufacturing an optical display element illustrated in FIGS. 6*b* and 7*b* needs to manufacture the B type optical display element B, the system 200*b* passes the same process as the optical display element manufacturing system 100*b* illustrated in FIGS. 3*b* and 4*b*.

In the second pivot step S70 in the second exemplary embodiment, the panel W is pivoted by the second pivot unit 70 to reverse positional relationships of the long edge LE and the short edge SE of the panel W to each other between a time after the optical films F1' and F2' are laminated onto one plane P1 of the panel W and a time before the optical films F1' and F2' are laminated onto the other plane P2 of the panel W.

In the optical display element manufacturing systems 200*a* and 200*b* illustrated in FIGS. 6*a* and 6*b*, the second laminating unit 80 is configured to laminate the optical films F1' and F2' in a direction D_80 parallel to the transport line PL of the panel W at the upper side of the panel W.

As a case in which the optical display element manufacturing system 200*a* illustrated in FIG. 6*a* needs to manufacture the A type optical display element A, the second laminating direction L2 in which the optical films F1' and F2' need to be laminated onto the other plane P2 of the panel W is set as the long-edge (LE) longitudinal direction LD of the panel W.

Meanwhile, in the panel W after the first optical film F1' is laminated onto one plane P1 by the first laminating unit 50, the second laminating directions L2 and LD are orthogonal to the transport line PL of the panel W. In this case, the panel W is pivoted by the second pivot unit 70 so that the positional relationships of the long edge LE and the short edge SE of the panel W are reversed to each other and the second laminating direction L2 and LD and the transport line PL of the panel W are thus parallel to each other.

As a case in which the optical display element manufacturing system 200*a* illustrated in FIG. 6*b* needs to manufacture the B type optical display element B, the second laminating direction L2 in which the optical films F1' and F2' need to be laminated onto the other plane P2 of the panel W is set as the short-edge (SE) longitudinal direction SD of the panel W.

Meanwhile, in the panel W after the second optical film F2' is laminated onto one plane P1 by the first laminating unit 50, the second laminating directions L2 and SD are orthogonal to the transport line PL of the panel W. In this case, the panel W is pivoted by the second pivot unit 70 so that the positional relationships of the long edge LE and the short edge SE of the panel W are reversed to each other and the second laminating direction L2 and SD and the transport line PL of the panel W are thus parallel to each other.

The second laminating step S80 in the second exemplary embodiment is the same as the second laminating step S80 in the exemplary embodiment in terms of most components and effects and the second laminating unit 80 is configured to laminate the optical films F1' and F2' in the direction D_80 parallel to the transport line PL of the panel W at the upper side of the panel W.

As a case in which the optical display element manufacturing system 200*a* illustrated in FIG. 6*a* needs to manufacture the A type optical display element A, since the second laminating direction L2 set as the direction in which the optical films F1' and F2' are laminated on the other plane P2 of the panel W in the laminating direction condition is the long-edge (LE) longitudinal direction LD of the panel W, in the second laminating step S80, the second optical film F2' formed with a width W_F2 corresponding to the short edge SE of the panel W is used to be laminated on the other plane P2 of the panel W in the long-edge (LE) longitudinal direction LD of the panel W.

Since the second laminating direction L2 set as the direction in which the optical films F1' and F2' are laminated on the other plane P2 of the panel W in the laminating direction condition is the long-edge (LE) longitudinal direction LD of the panel W, in the second laminating step S80, the second optical film F2' formed with the width W_F2 corresponding to the short edge SE of the panel W is used to be laminated on the other plane P2 of the panel W in the long-edge (LE) longitudinal direction LD of the panel W.

As a case in which the optical display element manufacturing system 200b illustrated in FIG. 6b needs to manufacture the B type optical display element B, since the second laminating direction L2 set as the direction in which the optical films F1' and F2' are laminated on the other plane P2 of the panel W in the laminating direction condition is the short-edge (SE) longitudinal direction SD of the panel W, in the second laminating step S80, the first optical film F1' formed with a width W_F1 corresponding to the long edge LE of the panel W is used to be laminated on the other plane P2 of the panel W in the short-edge (SE) longitudinal direction SD of the panel W.

As a result, the B type optical display element B may be manufactured, in which the optical film is laminated in the long-edge (LE) longitudinal direction LD based on one plane P1 of the panel W and the optical film is laminated in the short-edge (SE) longitudinal direction SD based on the other plane P2 of the panel W.

In accordance with the optical display element manufacturing systems 200a and 200b according to the second exemplary embodiment of the present invention, two types of optical display elements (the A type optical display element A and the B type optical display element B) may be manufactured by a single manufacturing line and the optical display element manufacturing system includes the second pivot unit 70, and as a result, both supply directions of the first optical film F1' and the second optical film F2' to the panel W may be configured to be parallel to the transport line PL of the panel W and the transport line PL of the panel W and supply lines of the optical films F1' and F2' are configured in a straight form to reduce a total system size.

The systems 300a and 300b for manufacturing an optical display element according to the third exemplary embodiment of the present invention may be configured in such a manner that a transport line PL of a panel W is a substantially straight line, a laminating unit laminating optical films F1' and F2' on one plane P1 of the panel W is a first laminating unit 50, a laminating unit laminating the optical films F1' and F2' on the other plane P2 of the panel W is a second laminating unit 80, a position onto which the first laminating unit 50 laminates the optical films F1' and F2' is a lower side of the panel W, a position onto which the second laminating unit 80 laminates the optical film F1' and F2' is an upper side of the panel W, a direction in which the first laminating unit 50 supplies the optical films F1' and F2' is parallel to the transport line PL of the panel W, and a direction in which the second laminating unit 80 supplies the optical films F1' and F2' is also parallel to the transport line PL of the panel W, as illustrated in FIGS. 8a and 8b.

In the case of the systems 300a and 300b for manufacturing an optical display element, which are illustrated in FIGS. 8a and 8b, a panel supply plane condition between one plane P1 and the other plane P2 of the panel W supplied by a panel supply unit 10, which faces the lower side of the panel W is set to be one plane P1 of the panel W and a condition of a panel supply direction PD set to be parallel to the transport line PL of the panel between a longitudinal direction ILD of an initial long edge LE and the longitudinal direction ISD of an initial short edge SE of the panel W supplied by the panel supply unit 10 is set to be the longitudinal direction ISD of the initial short edge SE of the panel.

Further, in the case of the system 300a for manufacturing an optical display element, which are illustrated in FIGS. 8a and 7a, the laminating direction condition is set in such a manner that a first laminating direction L1 set as a direction in which the optical films F1' and F2' are laminated onto one plane P1 of the panel W is set as a longitudinal direction SD of a short edge SE of the panel W and a second laminating direction L2 set as a direction in which the optical films F1' and F2' are laminated onto the other plane P2 of the panel W is set as a longitudinal direction LD of a long edge LE of the panel W. That is, the laminating direction condition corresponds to the condition in which the A type optical display element A may be manufactured.

On the contrary, in the case of the system 300b for manufacturing an optical display element, which are illustrated in FIGS. 8b and 7b, the laminating direction condition is set in such a manner that the first laminating direction L1 set as the direction in which the optical films F1' and F2' are laminated onto one plane P1 of the panel W is set as the longitudinal direction SD of the long edge LE of the panel W and the second laminating direction L2 set as the direction in which the optical films F1' and F2' are laminated onto the other plane P2 of the panel W is set as the short-edge SE longitudinal direction SD of the of the panel W. That is, the laminating direction condition corresponds to the condition in which the B type optical display element B may be manufactured.

Herein, each of the two laminating direction conditions (the condition to manufacture the A type optical display element A/the condition to manufacture the B type optical display element B) may correspond to a condition to manufacture a so-called O mode optical display element and a condition to manufacture a so-called E mode optical display element, respectively according to a relationship between an initial alignment direction of liquid crystal cells and an absorption axis direction of a polarization plate included in the optical film laminated on one plane P1 of the panel W.

The panel supply step S10 to the first laminating step S50 of the third exemplary embodiment pass the same process as the panel supply step S10 to the first laminating step S50 in the exemplary embodiment on the whole.

In detail, in the panel supply step S10 to the first laminating step S50, as a case in which the system 200a for manufacturing an optical display element, which are illustrated in FIGS. 8a and 7a needs to manufacture the A type optical display element A, the system 200a passes the same process as the optical display element manufacturing system 100a illustrated in FIGS. 3a and 4a and as a case in which the system 200b for manufacturing an optical display element 200b illustrated in FIGS. 8b and 7b needs to manufacture the B type optical display element B, the system 200b passes the same process as the optical display element manufacturing system 100b illustrated in FIGS. 3b and 4b.

In a second pivot step S70' in the third exemplary embodiment, the panel W is pivoted by a second pivot unit 70' around a pivot axis (not illustrated) which is parallel to both planes P1 and P2 of the panel W and not parallel to either edge of the long edge LE and the short edge SE of the panel W to reverse the positional relationships of the long edge LE and the short edge SE of the panel W to each other and reverse the directions which one plane P1 and the other plane P2 face between a time after the optical films F1' and F2' are laminated onto one plane P1 of the panel W and a time before the optical films F1' and F2' are laminated onto the other plane P2 of the panel W. Herein, the pivot axis preferably forms an angle at 45° with the transport line PL of the panel.

In the optical display element manufacturing systems 300a and 300b illustrated in FIGS. 8a and 8b, the second laminating unit 80 is configured to laminate the optical films F1' and F2' in a direction D_80 parallel to the transport line PL of the panel W at the lower side of the panel W.

As a case in which the optical display element manufacturing system 300a illustrated in FIG. 8a needs to manufacture the A type optical display element A, the second laminating direction L2 in which the optical films F1' and F2' need to be laminated onto the other plane P2 of the panel W is set as the long-edge (LE) longitudinal direction LD of the panel W.

Meanwhile, in the panel W after the first optical film F1' is laminated onto one plane P1 by the first laminating unit 50, the second laminating directions L2 and LD are orthogonal to the transport line PL of the panel W and the direction (the upper side of the panel W) which the other plane P2 of the panel W faces and the position (the lower side of the panel W) at which the second laminating unit 80 laminates the second optical film are different from each other. In this case, the panel W is pivoted by the second pivot unit 70' to reverse the positional relationships of the long edge LE and the short edge SE of the panel W to each other and reverse the directions which one plane P1 and the other plane P2 of the panel W face, and as a result, the second laminating direction L2 and LD and the transport line PL of the panel W are parallel to each other and the direction which the other plane P2 of the panel W faces and the position onto which the second laminating unit 80 laminates the second optical film coincide with each other.

As a case in which the optical display element manufacturing system 300b illustrated in FIG. 8b needs to manufacture the B type optical display element B, the second laminating direction L2 in which the optical films F1' and F2' need to be laminated onto the other plane P2 of the panel W is set as the short-edge (SE) longitudinal direction SD of the panel W.

Meanwhile, in the panel W after the second optical film F2' is laminated onto one plane P1 by the first laminating unit 50, the second laminating directions L2 and SD are orthogonal to the transport line PL of the panel W and the direction (the upper side of the panel W) which the other plane P2 of the panel W faces and the position (the lower side of the panel W) at which the second laminating unit 80 laminates the second optical film are different from each other. In this case, the panel W is pivoted b the second pivot unit 70' to reverse the positional relationships of the long edge LE and the short edge SE of the panel W to each other and reverse the directions which one plane P1 and the other plane P2 of the panel W face, and as a result, the second laminating directions L2 and SD and the transport line PL of the panel W are parallel to each other and the direction which the other plane P2 of the panel W faces and the position onto which the second laminating unit 80 laminates the second optical film coincide with each other.

The second laminating step S80 in the third exemplary embodiment is most the same as the second laminating step S80 in the exemplary embodiment in terms of most components and effects and the second laminating unit 80 is configured to laminate the optical films F1' and F2' in the direction D_80 parallel to the transport line PL of the panel W at the lower side of the panel W.

As a case in which the optical display element manufacturing system 300a illustrated in FIG. 8a needs to manufacture the A type optical display element A, since the second laminating direction L2 set as the direction in which the optical films F1' and F2' are laminated on the other plane P2 of the panel W in the laminating direction condition is the long-edge (LE) longitudinal direction LD of the panel W, in the second laminating step S80, the second optical film F2' formed with a width W_F2 corresponding to the short edge SE of the panel W is used to be laminated on the other plane P2 of the panel W in the long-edge (LE) longitudinal direction LD of the panel W.

Since the second laminating direction L2 set as the direction in which the optical films F1' and F2' are laminated on the other plane P2 of the panel W in the laminating direction condition is the long-edge (LE) longitudinal direction LD of the panel W, in the second laminating step S80, the second optical film F2' formed with a width W_F2 corresponding to the short edge SE of the panel W is used to be laminated on the other plane P2 of the panel W in the long-edge (LE) longitudinal direction LD of the panel W.

As a case in which the optical display element manufacturing system 300b illustrated in FIG. 8b needs to manufacture the B type optical display element B, since the second laminating direction L2 set as the direction in which the optical films F1' and F2' are laminated on the other plane P2 of the panel W in the laminating direction condition is the short-edge (SE) longitudinal direction SD of the panel W, in the second laminating step S80, the first optical film F1' formed with a width W_F1 corresponding to the long edge LE of the panel W is used to be laminated on the other plane P2 of the panel W in the short-edge (SE) longitudinal direction SD of the panel W.

As a result, the B type optical display element B may be manufactured, in which the optical film is laminated in the long-edge (LE) longitudinal direction LD based on one plane P1 of the panel W and the optical film is laminated in the short-edge (SE) longitudinal direction SD based on the other plane P2 of the panel W.

In accordance with the optical display element manufacturing systems 300a and 300b according to the third exemplary embodiment of the present invention, two types of optical display elements (the A type optical display element A and the B type optical display element B) may be manufactured by a single manufacturing line and the optical display element manufacturing system includes the second pivot unit 70, and as a result, both supply directions of the first optical film F1' and the second optical film F2' to the panel W may be configured to be parallel to the transport line PL of the panel W and the transport line PL of the panel W and supply lines of the optical films F1' and F2' are configured in a straight form to reduce a total system size and both positions of the panel W onto which the first and second optical films F1' and F2' are laminated may be set to the lower side of the panel W to minimize foreign materials which may be generated while laminating from being introduced as compared with the case of laminating the optical film at the upper side of the panel W.

The aforementioned description of the present invention is to be exemplified, and it can be understood by those skilled in the art that the technical spirit or required features of the present invention can be easily modified in other detailed forms without changing the technical spirit or requisite features of the present invention. Therefore, it should be appreciated that the aforementioned embodiments are all illustrative in all aspects and are not restricted. For example, respective constituent elements described as single types can be distributed and implemented, and similarly, constituent elements described to be distributed can also be implemented in a coupled form.

The scope of the present invention is represented by claims to be described below rather than the detailed description, and it is to be interpreted that the meaning and scope of the claims and all the changes or modified forms derived from the equivalents thereof come within the scope of the present invention.

The invention claimed is:

1. A system for manufacturing an optical display element, which manufactures a plurality of optical display elements distinguished from each other depending on a direction in which an optical film is laminated on a predetermined plane of a rectangular panel, both planes of the panel being laminated by an optical film, the system comprising:
   a panel supply unit supplying the panel;
   a panel transport unit transporting the supplied panel;
   a first laminating unit laminating the optical film onto a first plane of the panel in a direction parallel to a panel transport direction; and
   a second laminating unit laminating the optical film onto a second plane of the panel so that an absorption axis direction of the optical film is orthogonal to an absorption axis direction of the optical film laminated onto the first plane of the panel,
   wherein one of a longitudinal direction of an initial long edge and a longitudinal direction of an initial short edge of the panel supplied by the panel supply unit is selected as a panel supply direction, which is parallel to the transport direction of the panel and one of the longitudinal direction of a long edge and the longitudinal direction of a short edge of the panel is selected as a first laminating direction in which the optical film is laminated onto the first plane of the panel and the selections are predetermined as a process condition, and
   the system includes a first pivot unit, pivoting the panel to reverse positional relationship of the initial long edge and the initial short edge of the panel when the panel supply direction is orthogonal to the first laminating direction so that the first laminating unit laminates the optical film onto the first plane of the panel with the first laminating direction parallel to the panel transport direction, and not pivoting the panel when the panel supply direction is parallel to the first laminating direction.

2. The system for manufacturing an optical display element of claim 1, wherein in the optical display element, the panel includes liquid crystal cells and the first plane of the panel is disposed at a light source of the liquid crystal cells.

3. The system for manufacturing an optical display element of claim 2, wherein the optical film includes a polarization plate, and
   in the process condition, the first laminating direction is set in such a manner that an initial alignment direction of the liquid crystal cells is parallel to the absorption axis direction of the polarization plate included in the optical film laminated onto the first plane of the panel.

4. The system for manufacturing an optical display element of claim 2, wherein the optical film includes a polarization plate, and
   in the process condition, the first laminating direction is set in such a manner that an initial alignment direction of the liquid crystal cells is orthogonal to the absorption axis direction of the polarization plate included in the optical film laminated onto the first plane of the panel.

5. The system for manufacturing an optical display element of claim 1, wherein a first optical film is unrolled from a first film roll on which the first optical film, which elongates with a width corresponding to the long edge of the panel, is rolled, and laminated onto one of the first and second planes of the panel, and
   a second optical film is unrolled from a second film roll on which the second optical film, which elongates with a width corresponding to the short edge of the panel, is rolled, and laminated onto the other one of the first and second planes of the panel, which is opposite to the plane onto which the first optical film is laminated, to manufacture the optical display element.

6. The system for manufacturing an optical display element of claim 5, wherein based on the first laminating direction in the process condition, the first optical film is used for one of the first and second laminating units and the second optical film is used for the other one of the first and second laminating units.

7. The system for manufacturing an optical display element of claim 6, wherein each of the first and second laminating units is formed to correspond to the widths of both the first and second optical films.

8. The system for manufacturing an optical display element of claim 6, wherein the first laminating unit includes a first optical film supply section unrolling and supplying the optical film from the film roll on which the optical film is rolled and a first laminating section laminating the optical film supplied from the first optical film supply section onto the first plane of the panel,
   the second laminating unit includes a second optical film supply section unrolling and supplying the optical film from the film roll on which the optical film is rolled and a second laminating section laminating the optical film supplied from the second optical film supply section onto the second plane of the panel,
   each of the first optical film supply section and the second optical film supply section is formed to correspond to the widths of both the first film roll and the second film roll, and
   each of the first and second laminating sections is formed to correspond to the widths of both the first and second optical films.

9. The system for manufacturing an optical display element of claim 1, further comprising:
   a second pivot unit pivoting the panel so as to reverse the positional relationship of the long edge and the short edge of the panel to each other between a time after the optical film is laminated onto the first plane of the panel and a time before the optical film is laminated onto the second plane of the panel.

10. The system for manufacturing an optical display element of claim 9, wherein the second pivot unit pivots the panel around a pivot axis which is parallel to both planes of the panel and is not parallel to either of the long edge and the short edge of the panel so as to reverse directions which a first plane and the second plane of the panel face.

* * * * *